United States Patent [19]

Sweeney

[11] Patent Number: 5,395,631
[45] Date of Patent: Mar. 7, 1995

[54] METHOD FOR PREPARING A CHEESE PRODUCT

[75] Inventor: Kevin Sweeney, Dungargan, Ireland

[73] Assignee: Waterford Co-Operative Dairy and Trading Society Limited, Dungarvan, Ireland

[21] Appl. No.: 169,970

[22] Filed: Dec. 20, 1993

Related U.S. Application Data

[63] Continuation of Ser. No. 870,223, Apr. 20, 1992, abandoned, which is a continuation of Ser. No. 506,157, Apr. 9, 1990, abandoned.

[51] Int. Cl.$^6$ ............................................. A23C 19/055
[52] U.S. Cl. ......................................... 426/42; 426/34; 426/36; 426/40; 426/46; 426/576; 426/662
[58] Field of Search ....................... 426/34, 36, 40, 42, 426/46, 576, 662

[56] References Cited

U.S. PATENT DOCUMENTS

| | | | |
|---|---|---|---|
| 3,899,605 | 8/1975 | Schaap | 426/582 |
| 4,397,878 | 8/1983 | Koide et al. | 426/40 |
| 4,534,982 | 8/1985 | Yoshida et al. | 426/36 |
| 4,568,548 | 2/1986 | Sprenger | 426/36 |
| 4,822,623 | 4/1989 | Middleton | 426/36 |

FOREIGN PATENT DOCUMENTS

| | | |
|---|---|---|
| 1458685 | 10/1965 | France . |
| 67634 | 5/1892 | Germany . |
| 820995 | 5/1958 | United Kingdom . |
| 1088195 | 9/1965 | United Kingdom . |
| 1277802 | 6/1972 | United Kingdom . |
| 2008923 | 6/1979 | United Kingdom . |
| 2080325 | 2/1982 | United Kingdom . |
| 2205726 | 12/1988 | United Kingdom . |

OTHER PUBLICATIONS

"Homogenization in Dairy Processing", Milk Industry, 87 (10): 1–4 (1975).
Lyubinskas et al., P1499 FSTA 77050880 (1976).
Valtadzhieva et al., P1324 FSTA 74046984 (1972).
Valtkus et al., P1512 FSTA 82058396 (1979).
Ehrlich, E. et al., Oxford American Dictionary, 1980, pp. 259, 799, Oxford University Press, New York.
Fennema, O. R., Food Chemistry, 1985, p. 169, Marcel-Dekker, Inc. (New York).

*Primary Examiner*—Helen Pratt
*Attorney, Agent, or Firm*—Jacobson, Price, Holman & Stern

[57] ABSTRACT

A cheese product having a low level of saturated fat and cholesterol, a high level of polyunsaturated fat and good organoleptic properties is prepared by adding a fat-based cream to skim, semi-skimmed or low fat milk to a cheese vat and processing using conventional techniques to form cheese. The cream is prepared by adding a blend of vegetable pasteurized oils such as soya oil and hydrogenated soya oil and an emulsifier to an aqueous phase comprising a pasteurized blend of water and a stabilizer such as gelatin. The fat-in-water emulsion thus formed is then blended and homogenized to form the cream.

15 Claims, No Drawings

METHOD FOR PREPARING A CHEESE PRODUCT

This is a continuation of application Ser. No. 07/870,223, filed Apr. 20, 1992, which was abandoned upon the filing hereof; which in turn is a continuation of application Ser. No. 07/506,157, filed Apr. 9, 1990, which was abandoned upon the filing hereof.

BACKGROUND OF THE INVENTION

The invention relates to a cheese product and to a method for preparing such a cheese product. In particular, the invention relates to a non milk fat cheese or a blend of milk fat and non milk fat cheese and to a method for the preparation thereof.

SUMMARY OF THE INVENTION

According to the invention there is provided a method for preparing a cheese product comprising:
 forming a fat-based cream by homogenizing a fat phase and a water phase, the fat being coated by a membrane such that in a casein lattice the fat substantially mimics milk fat,
 adding the cream product to a cheese vat either alone or in combination with a milk fat, and
 preparing cheese by adding a clotting enzyme to the vat.

In one embodiment of the invention the membrane is formed by a mixture of an emulsifier and a stabilizer.

Preferably the emulsifier is lecithin.

Preferably the stabilizer is a hydrocolloid such as gelatin.

In a preferred embodiment of the invention the emulsifier is added to the fat prior to homogenization.

Preferably the stabilizer with or without the emulsifier or part thereof is added to the water prior to homogenization.

Protein except casein with or without an emulsifier and/or a hydrocolloid may be used to form the membrane. Preferably the protein is whey protein.

In one embodiment of the invention the vegetable fat comprises a blend of vegetable fats which has a similar melting point profile to milk fat over the range 5° to 38° C.

Preferably the blend comprises a solid vegetable fat and a vegetable fat which is liquid at room temperature.

The solid and liquid fats may have the same or different origins.

Preferably the solid vegetable fat comprises hydrogenated soya oil and/or hydrogenated coconut oil.

Preferably the liquid vegetable fat comprises soya oil and/or coconut oil.

In one embodiment of the invention the cheese contains milk fat, the ratio of milk fat to vegetable fat being in the range 0:1 to 3:1.

The milk fat source may comprise pasteurized skimmed, semi-skimmed or low-fat milk.

Preferably the water is heated to approximately 80° C. for pasteurization prior to addition of the vegetable fat and the vegetable fat and the water phases are mixed with a blender to uniformly distribute the fat phase in the aqueous phase prior to homogenization which is preferably carried out in one or more stages, the or each stage being at a pressure of from 100 to 4,000 psi, and at a temperature in the range of approximately 40° C. to 70° C.

Further processing of the cheese is by conventional cheese making techniques.

The invention also provides a cheese product whenever made by the process of the invention.

The invention also provides a fat-based cream product for use in cheese making which comprises a fat or blend of fats homogenized with water in the presence of ingredients which form a membrane around the fat so that in cheese making the fat substantially mimics milk fat in the casein lattice.

In one embodiment of the invention the fat is a vegetable fat or blend of vegetable fats.

According to the invention there is also provided a cheese product containing casein which is in a lattice structure, the cheese product including a fat-based cream, the fat being coated with a membrane such that in the casein lattice the fat substantially mimics milk fat.

In one embodiment of the invention the fat is a vegetable fat or blend of vegetable fats.

In one embodiment of the invention the membrane is formed by a mixture of an emulsifier and a stabilizer.

Preferably the emulsifier is lecithin, and preferably the stabilizer is a hydrocolloid such as gelatin.

In another embodiment of the invention the membrane is formed by a protein excluding casein with or without an emulsifier and/or stabilizer, the protein preferably comprising whey protein.

In one embodiment of the invention the vegetable fat comprises a blend of vegetable fats which has a similar melting point profile to milk fat over the range 5° to 38° C., preferably the blend comprises a solid vegetable fat and a vegetable fat which is liquid at room temperature.

The solid and liquid fats may be of the same origin such as soya or coconut, or the solid and liquid fats may be of different origins.

Typically the solid vegetable fat comprises hydrogenated soya oil and/or hydrogenated coconut oil and preferably the liquid vegetable fat comprises soya oil and/or coconut oil.

Preferably the cheese contains milk fat, the ratio of milk fat to vegetable fat being in the range 0:1 to 3:1, preferably the milk fat source comprises pasteurized skimmed, semi-skimmed or low-fat milk.

DESCRIPTION OF PREFERRED EMBODIMENTS

The invention will be more clearly understood from the following description given by way of example only. In all cases the cream for use in preparing the cheese products was prepared from the following ingredients:

| | |
|---|---|
| 40.00% | fat |
| 59.76% | water |
| 0.60% | stabilizer (a hydrocolloid such as gelatin) |
| 1.00% | emulsifier (in these cases lecithin) |

(percentages of stabilizers and emulsifiers are by weight of total fat).

EXAMPLE 1

The fat used was a blend of soya oil and hydrogenated soya oil.

The fat is pasteurized by heating to approximately 80° C. and the lecithin emulsifier is added.

A pasteurized blend of water and a stabilizer such as a hydrocolloid, for example gelatin, is heated to approximately 60° C.

The hot fat phase is then added to the water phase to cool the fat phase to approximately 60° C.–70° C. The fat-in-water emulsion is then blended to uniformly distribute the fat in the aqueous phase.

The blended mixture is then homogenized by a two stage homogenization process at a pressure in the range 100 to 4,000 psi and at a temperature of between 40° and 70° C.

The cream formed in the homogenization process is then collected.

To prepare a cheese using the cream product, skim milk powder may be added to skim milk to fortify the skim milk. The skim milk is then pasteurized and added to a cheese vat. Starter bacteria are then added to the skim milk. The cream is added to the skim milk and mixed in the milk. A clotting enzyme is subsequently added to the vat.

Cheese is then produced using conventional cheese making techniques. The cheese has approximately 32 to 33% fat of which approximately 99% is vegetable fat and the balance is milk fat.

EXAMPLE 2

Low Fat Cheese

A low fat cheese with about 100% fat substitution was prepared by heating hydrogenated soya oil and soya oil to about 80° C. Lecithin emulsifier was then dissolved in the hot oil to form a fat phase. The water phase was formed by dissolving gelatin stabilizer in water at 80° C.

The oil and water phases were then blended and the oil phase was mixed with the water phase to form an oil-in-water emulsion which was then homogenized at approximately 70° C. and at a first stage pressure of 800 psi and a second stage pressure of 200 psi, and cooled to approximately 32° C.

The resulting cream was added to skim milk at approximately 32° C. in a cheese vat. The skim milk may be fortified with skim milk powder if desired.

Preferably starter bacteria are added to the skim milk approximately 20 to 30 minutes prior to the addition of the cream product.

Rennet (clotting enzyme) is then added to the mixture of cream and skim milk and cheese is manufactured in a conventional manner.

EXAMPLE 3

Reduced Fat Cheese

A reduced fat cheese with approximately 50% fat substitution was prepared by first heating a blend of hydrogenated soya oil, coconut oil and soya oil to approximately 80° C. Lecithin emulsifier was then dissolved in the hot oil to form the oil phase.

Gelatin was dissolved in water at 80° C. to form the water phase.

The oil and water phases were blended and the oil phase was then introduced into the water phase and blended to form an oil-in-water emulsion. The oil-in-water emulsion was then homogenized at approximately 70° C. and a first stage pressure of 2,500 and a second stage pressure of 500 psi and cooled to approximately 32° C.

The resulting cream product is added to semi-skimmed milk at approximately 32° C. in a cheese vat. The semi-skim may be fortified with skim milk powder if desired.

It is preferable to add starter bacteria to the semi-skim milk approximately 20 to 30 minutes prior to the addition of the cream product.

Rennet was then added to the semi-skim milk and cream mixture and cheese is manufactured in the conventional manner.

The cheese product has approximately 50% milk fat and 50% vegetable fat.

EXAMPLE 4

Low Fat Cheese

A low fat cheese with approximately 100% fat substitution was prepared by blending hydrogenated soya oil, coconut oil and soya oil and heating the blend to approximately 80° C. Lecithin emulsifier was then dissolved in the hot oil to form the oil phase.

To form the water phase gelatin was dissolved in water at approximately 80° C. and blended.

The oil phase was then added to the water phase and the mixture blended to form an oil-in-water emulsion. The oil-in-water blend was then homogenized at approximately 70° C. at a first stage pressure of 2,000 psi and cooled to approximately 32° C.

The resultant cream product is added to semi-skim milk at approximately 32° C. in a cheese vat. The skim may be fortified with skim milk powder if desired. Preferably starter bacteria are added to the skim milk approximately 20 to 30 minutes prior to the addition of the cream.

Rennet is then added to the milk and cream mixture and cheese is manufactured in the conventional manner.

The cheese products prepared by the methods described are low in saturated fat and cholesterol and high in polyunsaturated fat and have good organoleptic properties.

To prepare a low fat cheese a low fat milk is used.

If desired a suitable colouring agent such as Annato or β. Carotene may be added to the cream product.

The cream produced may have any desired fat content from a range of between 5% and 95%. The protein to fat ratio is of importance in determining the characteristics of the cheese produced. The more fat that is present the greater the flow characteristics of the cheese i.e. the softer the cheese. This ratio is also important in determining the texture of the cheese.

Any suitable fat such as vegetable fat or blend of vegetable fats may be used. Depending on the fat used a cheese of any desired fat contant or consistency may be prepared. Generally a vegetable fat or blend of vegetable fats are used. The vegetable fat or blend of vegetable fats are selected such that when coated by a membrane the fat behaves somewhat like conventional milk fat in cheese production. The term "conventional milk fat" in this context refers to milk which is substantially in a natural i.e. non-homogenized form in which form the milk does not have any substantial coating of casein.

We have found that by coating the fat with a suitable membrane the fat will substantially mimic the properties of conventional milk fat in cheese, the coated fat globules being trapped within the casein lattice and behaving somewhat in the same manner as milk fat globules.

The membrane may be formed by a mixture of an emulsifier such as lecithin and a stabilizer such as hydrocolloid, for example gelatin. The emulsifier may be soluble in fat in which case it is added to the fat phase or may be soluble in water in which case it is added to the aqueous phase.

Alternatively experiments to date have indicated that a suitable membrane may also be formed using a non-casein protein such as whey protein.

I claim:

1. A method for preparing a cheese product comprising:

forming a fat-based cream by homogenizing a fat phase and a water phase, wherein said fat-based cream contains fat being coated by a membrane which is free of casein such that in a casein lattice produced during cheese making, the fat substantially mimics the behavior of milk fat, adding the fat-based cream product and milk after homogenization to a cheese vat either alone or in combination with a milk fat, and preparing the cheese product by adding a clotting enzyme to the vat.

2. A method as claimed in claim 1 wherein the membrane-forming component is a mixture of an emulsifier and a stabilizer.

3. A method as claimed in claim 2 wherein the emulsifier is lecithin, and the stabilizer is a hydrocolloid.

4. A method as claimed in claim 3 wherein the stabilizer is gelatin.

5. A method as claimed in claim 2 wherein the emulsifier is added to fat to form the fat phase prior to homogenization and the stabilizer is added to water to form the water phase prior to homogenization.

6. A method as claimed in claim 2 wherein the stabilizer and at least part of the emulsifier are added to water to form the water phase prior to homogenization.

7. A method as claimed in claim 1 wherein the fat comprises a blend of vegetable fats which has a similar melting point profile to milk fat over the range 5° to 38° C.

8. A method as claimed in claim 7 wherein the blend of vegetable fats comprises a solid vegetable fat and a vegetable fat that is liquid at room temperature.

9. A method as claimed in claim 8 wherein the solid and liquid fats are of the same origin.

10. A method as claimed in claim 8 wherein the solid vegetable fat comprises hydrogenated soya oil and/or hydrogenated coconut oil and the liquid vegetable fat comprises soya oil and/or coconut oil.

11. A method as claimed in claim 8 wherein the solid and liquid fats are of different origins.

12. A method as claimed in claim 1 wherein the cheese contains milk fat, the ratio of milk fat to vegetable fat being up to 3:1.

13. A method as claimed in claim 12 wherein the milk fat source comprises pasteurized skimmed, semi-skimmed or low fat milk.

14. A method as claimed in claim 1 wherein the water is heated to approximately 80° C. for pasteurization prior to addition of the fat phase and the fat and the water phases are mixed with a blender to uniformly distribute the fat phase in the water phase prior to homogenization, said homogenization being carried out at a pressure of from 100 to 4,000 psi, and at a temperature in the range of approximately 40° C. to 70° C.

15. A method as claimed in claim 14 wherein the homogenization is carried out in at least two stages, each of said homogenization stages being carried out at a pressure of from 100 to 4,000 psi, and at a temperature in the range of approximately 40° to 70° C.

* * * * *